Dec. 20, 1938.    R. B. GRAY ET AL    2,140,672
METHOD OF PRODUCING A SEAL
Filed April 17, 1937
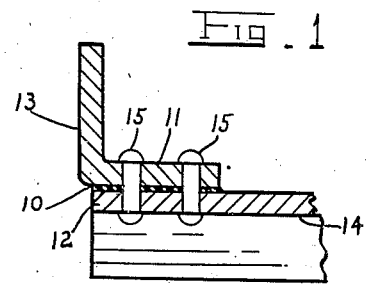
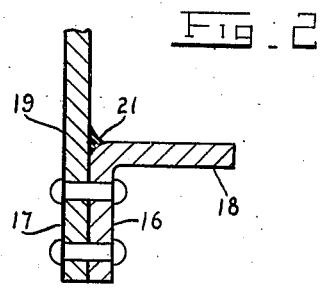
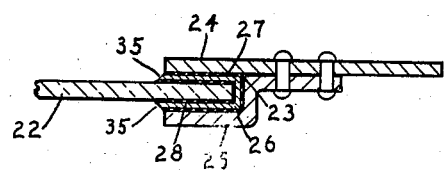
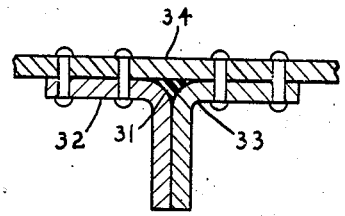
INVENTOR.
REID B. GRAY
HARRY M. SHEALEY
ATTORNEY.

Patented Dec. 20, 1938

2,140,672

UNITED STATES PATENT OFFICE 2,140,672

METHOD OF PRODUCING A SEAL

Reid B. Gray, Dundalk, and Harry M. Shealey, Baltimore, Md., assignors to The Glenn L. Martin Company, Baltimore, Md.

Application April 17, 1937, Serial No. 137,505

5 Claims. (Cl. 189—36)

This invention relates to an improved seal and the method of producing the same.

In the construction of aircraft as well as other commercial products it has been found advantageous, and in some cases necessary, to employ means for sealing one member to another that will not only be unaffected by such liquids as motor fuel oil and salt water, but which will be possessed of a required amount of pliability. Such a seal must also be possessed of sufficient adhesive characteristics to positively maintain a leakproof connection.

It can be readily understood that fuel tanks employed in aircraft are subjected to various and sundry stresses and strains, particularly so when such fuel tanks are built-in and form a part of an aircraft wing structure, hull structure, sponson structure, and the like, and that unless the means employed for sealing the seams and joints in these structures are possessed of a required amount of pliability or plasticity, such seams will eventually become impaired to the extent of serious leaking. Likewise, a sealing means possessed of these same characteristics is desirable for sealing seams or joints in other portions of an aircraft, such as the body, window connections, and it is particularly desirable where glass is employed.

It is one object of this invention to provide means for sealing one member to another as well as a novel method of producing an improved seal.

Another object is to provide means for sealing one member to another which shall be possessed of a required amount of plasticity and have the characteristics of being unaffected by motor fuel, such as gasoline, lubricating oils, water, and the like.

Another object is to provide a novel method for sealing one member to another that shall produce a pliable seal which will withstand the stresses and strains encountered by the structures of aircraft and the like.

Another object is to provide a seal and a method of producing such seal that shall, in addition to being unaffected by petroleum fluids, serve as a corrosion inhibiter to those surfaces where it is applied.

A further object is to provide an improved seal and a novel method of producing the same which shall be pliable, rugged, simple in structure, efficient in operation, and comparatively cheap to manufacture.

A still further object is to provide an improved seal and the method of producing the same for sealing seams in aircraft such as those required in the installation of windows, body seams, and so forth, that shall operate to prevent the leakage of air through such seams when the aircraft is operated at high altitudes and may be subjected to differential air pressures.

The above and other objects will be made apparent throughout the further description of the invention when taken in connection with the accompanying drawing. It is to be distinctly understood that the drawing is not a definition of the invention, but merely illustrate certain forms by which the invention may be effectuated. The invention will be defined by the appended claims.

In the drawing:

Figure 1 is a fragmentary sectional view illustrating a simple lap seam embodying the invention.

Figure 2 is a fragmentary sectional view illustrating another embodiment of the invention employing a fillet.

Figure 3 is a fragmentary sectional view illustrating another embodiment of the invention in connection with the installation of a window, and Figure 4 is a fragmentary sectional view of another embodiment of the invention illustrating one manner in which the present sealing medium may be employed as a corrosion inhibitor in an unaccessible crevice.

In a preferred embodiment of the invention the sealing medium employed is known to the trade as liquid or plastic Thiokol or Thiokol cement. This product is manufactured by the Thiokol Corporation, Yardville, N. J. The particular ingredients of this plastic Thiokol cement are not known to me, but the preferred grades of this product are known to the trade as Thiokol G—18, G—20, and C—207. The major difference between Thiokol G—18 and G—20 is in the consistency of the two products. Thiokol G—20 is the thicker of the two and, of course, contains less solvent. Thiokol C—207 is very similar to G—20, except it appears to be of a slightly thicker consistency. The primary differences between Thiokol C—207 and G—18 and 20 are that C—207 is possessed of greater adhesive qualities and offers a greater resistance to cold-flow.

In the drawing, Figure 1 illustrates a simple lap connection, wherein Thiokol indicated at 10 is disposed between the lapped portions 11 and 12 of members 13 and 14, respectively. The lapped portions 11 and 12 may be firmly secured together by means of rivets, bolts, and the like, as indicated at 15.

It is specifically pointed out here that the success of using Thiokol as a sealing medium is dependent upon the method used in producing the seal. In the case of a lapped seam, as described in connection with Figure 1, an initial preparatory coat of Thiokol G—18 should first be applied to the surfaces to be sealed and allowed to air-dry two hours and a second brush coat of slightly heavier consistency should be applied over the initial preparatory coat. This second coat should air-dry until tacky, this time may vary some twenty-five to forty minutes, before lapping sheets or plates for riveting. This is necessary in order to overcome a natural tendency of the sealing medium to cold-flow under pressure.

Thiokol C—207 is applied in the same manner as G—18 and G—20, except that the thin coats consist of thinning the C—207 to the desired consistency.

Figure 2 illustrates one manner of applying a Thiokol fillet to a seam such as that formed by the lapped portions 16 and 17 of members 18 and 19, respectively. The Thiokol fillet indicated at 21 is best produced by applying a thin coat of Thiokol G—18 to the surface and permitting such coat to dry for a minimum of twenty minutes, or longer if production permits. Thiokol G—20 is then applied in the form of a fillet along the seam or joint as the case may be. The size or depth of this fillet is dependent upon the type of joint or seam to be sealed. The fillet should be dried by circulating air for a minimum of forty-eight hours before using any liquid in the compartment if such filleting is in a fuel compartment or tank.

When Thiokol sealing is used in connection with certain alloys, such as aluminum or polished steel, it is important that the surfaces of these alloys be treated in order that suitable adhesion will be obtained.

The method of treating aluminum or aluminum alloys for use with Thiokol consists in what is known by the trade as anodizing the surfaces of such alloys. Anodize is simply a trade-name which means that the metal to be treated is used as the anode in an electrolytic process. The present process consists in subjecting the alloy surfaces to an electrolytic bath of chromic acid. Other methods such as a sulphuric bath may be employed. Ordinarily suitable adhesion cannot be obtained on untreated aluminum or aluminum alloys. Polished steel surfaces should be roughened by emery or other means.

In the production of a metal to metal seal such as aluminum or aluminum alloy, it is not only necessary that the surfaces to be sealed be properly prepared, such as by anodizing, but it is paramount that sufficient drying time between the coats of Thiokol be allowed for permitting excess solvents to evaporate and the Thiokol, which is in the form of a synthetic rubber, to set up in the form of a flexible film.

Figure 3 of the drawings indicates one manner in which an aircraft window pane 22 may be installed in a window channel or frame 23. The cooperating edge of the window pane 22 is inserted in the channel 23 formed by the frame members 24 and 25. In this embodiment a U-shaped gasket 26 is employed which is adapted to encircle the periphery or side edges of the window pane 22 and serves as a cushion or shock absorbing member. Both surfaces of the gasket 26 are coated with Thiokol as indicated at 27 and 28. Even in this construction where Thiokol is used in connection with a gasket, it is preferable that the coat of Thiokol be permitted to set up for several minutes prior to assembling the structure.

Figure 4 illustrates an embodiment of the invention, wherein Thiokol 31 is used to fill the crevices formed between structural members 32, 33, and 34. In this embodiment, the Thiokol 31 does not only act as a seal, but serves as a corrosion inhibitor. Such unaccessible crevices frequently exist in such structures as the hull of flying boats, sponsons, and the like, and particularly where fuel tanks are built-in and form a part of such structures. It is difficult to preclude seepage of salt water as well as the seepage of gasoline, the latter often containing lead which attacks the metal structure.

Thiokol G—18 as received in original form is a heavy consistency and somewhat difficult to handle by brushing, especially where a thin film is desired. A thinner may be employed such as trichlorethylene or chloroform to obtain the required consistency.

In order to obtain a satisfactory fillet of Thiokol along a riveted lap or butt seam, a thin coat of G—18 should first be brushed along the seam, being sure to brush freely to permit any excess to penetrate into recesses. After this coat has dried to touch, not tacky, a second coat of G—18, not thinned, should be applied. This coat should also be a heavy one and not brushed too heavily as would thin it out. The initial thin coat generally requires about thirty minutes to set to touch. The second, which is a heavy coat, should be allowed to dry not less than twenty-four hours, and where production permits, forty-eight to seventy-two hours before testing sealing properties with either liquid or air. The time required will, of course, depend upon ventilation and temperature during this period.

It is imperative that where it is necessary to apply G—18 or G—20 in closed places where natural ventilation is poor that adequate artificial ventilation be provided while the operators are applying the same.

In the construction of a seam such as that illustrated in Figure 3 it may be advisable to apply Thiokol of sufficient body and consistency that a sufficient amount of the sealing medium will be squeezed or forced out of the seam and lie adjacent the lap and automatically form a sealing fillet, such as that shown at 35. In many cases G—18 in itself has sufficient body to form a sealing fillet, but in some cases, such as a window and so forth, a heavier grade of Thiokol is required. For such cases, Thiokol G—20 is recommended. However, where a fillet is desired, it should be obtained by the use of a heavy grade of Thiokol applied as a fillet.

Thiokol G—20 is of a consistency similar to putty and in itself has very poor adhesion to metal or other smooth materials. To successfully use G—20 for sealing it is necessary to first apply a thinned coat of G—18 to the parts or surfaces to be sealed. When this is set to touch, G—20 may be applied and will form a satisfactory bond with the thin coat of G—18.

Thiokol will not bleed through or discolor aluminum paint when painted after drying. However, G—18 will soften and destroy paint films when applied over the same.

No specific instructions for thinning can be given insofar as thinning should be done to provide a smooth flow and maximum penetration when brushed.

It is important when adding a thinner that only small quantities of thinner be added and the compound stirred vigorously until the added thinner is entirely taken up. Adding too great a quantity of thinner at one time might cause a curdling or precipitation of the compound.

Thiokol thinner trichlorethylene is quite volatile and it will be necessary where cans are opened and in use all day to occasionally add a small amount of thinner as the compound becomes too thick for satisfactory application.

Thiokol is a reaction product obtained from the interaction of sodium polysulfide and ethylene dichloride, and may be considered as being a type of a polymerized material which results from the reaction of sulfur and a halogenized unsaturated hydrocarbon.

Thiokol may be described as one form of synthetic rubber and some grades of Thiokol may or may not contain rubber as such and it is to be carefully noted that while the present invention may be utilized in connection with other grades of Thiokol as well as other compositions or synthetic rubber, that it is important that any grade of Thiokol or other equivalent synthetic rubber compounds do not contain more than 5% to 8% of rubber as such, since natural rubber products are definitely affected by motor fuels.

While I have illustrated this invention in connection with certain grades or classes of Thiokol it will be obvious to those skilled in the art that any synthetic rubber compound possessed of the characteristics herein above pointed out would probably be an equivalent to Thiokol.

We claim:

1. A method of forming a sealed connection between two structural members, comprising applying artificial hydrocarbon-resistant rubber cement of relatively low viscosity to each of the members, permitting such cement to dry, and then applying in fluid form an intervening layer of artificial hydrocarbon-resistant rubber cement of high viscosity for the purpose of sealing said members, said structural members being mechanically secured together in assembled relation.

2. The method of forming a sealed connection between two structural members, comprising applying a coat of artificial hydrocarbon-resistant rubber cement of relatively low viscosity to each of the opposed faces of the members, permitting such coats to dry, then applying in fluid form a layer of artificial hydrocarbon-resistant rubber cement of relatively high viscosity to one of said first coats, bringing said members together with said layer in contact with the second coat, and mechanically securing said members together in assembled relation.

3. The method of forming a sealed connection between two structural members, comprising mechanically securing said members together in assembled relation, applying artificial hydrocarbon-resistant rubber cement of relatively low viscosity to each of said members adjacent a point where they are secured together, permitting such cement to dry, and then applying in fluid form an intervening layer of artificial hydrocarbon-resistant rubber cement of high viscosity for the purpose of sealing said members.

4. In a method as claimed in claim 1, said rubber cement containing less than 10% of rubber.

5. In a method as claimed in claim 1, said rubber cement comprising Thiokol.

REID B. GRAY.
HARRY M. SHEALEY.